June 5, 1951  G. A. TUTTLE  2,555,428
POWER DRIVEN PRUNING SAW
Filed June 7, 1948  2 Sheets-Sheet 1

George A. Tuttle
INVENTOR.

BY
ATTORNEY

June 5, 1951            G. A. TUTTLE            2,555,428

POWER DRIVEN PRUNING SAW

Filed June 7, 1948            2 Sheets-Sheet 2

George A. Tuttle
INVENTOR.

BY
ATTORNEY

Patented June 5, 1951

2,555,428

UNITED STATES PATENT OFFICE 2,555,428

POWER-DRIVEN PRUNING SAW

George A. Tuttle, Anatone, Wash.

Application June 7, 1948, Serial No. 31,459

1 Claim. (Cl. 30—167)

This invention relates to a pruning saw and more particularly to a power-driven saw of the rotary type.

This pruning saw is used by a workman standing upon the ground and consists briefly of a tubular handle having at its rear a clutch for controlling rotation of a shaft mounted through the handle and a housing at its front end in which transmission mechanism is mounted for imparting rotary motion to rotary cutter means. It has been found that when a pruner of this type is provided with a single rotary blade it has a tendency to backlash and slip out of cutting engagement with a tree limb when cutting tough wood.

Therefore it is one object of the invention to provide a pruner having a pair of rotary blades mounted in closely disposed side by side relation to each other and rotated in opposite directions so that each blade serves to prevent the other from slipping out of cutting engagement with a limb to be cut from a tree being trimmed.

Another object of the invention is to provide a pruning saw having a pair of oppositely turning blades which are spaced from each other by a spacing disk so formed that while it prevents the blades from having contact with each other frictional binding caused by contact of the disk with confronting side faces of the saw blades will be reduced to a minimum.

Another object of the invention is to provide the pruning saw with a housing at the front end of its handle in which the saw blades and shafts for transmitting rotation to the blades are so mounted that they are compactly arranged and their weights so counterbalance each other that the pruning saw may be very easily held and operated.

Another object of the invention is to provide an improved clutch mechanism at the rear end of the handle which may be readily operated and is so located that it serves as a counterweight for the transmission housing and saw blades at the front end of the handle.

Another object of the invention is to provide a pruning saw which is of light weight, simple in construction and capable of being subjected to rough usage without damage.

The invention is illustrated in the accompanying drawings wherein.

Figure 1:
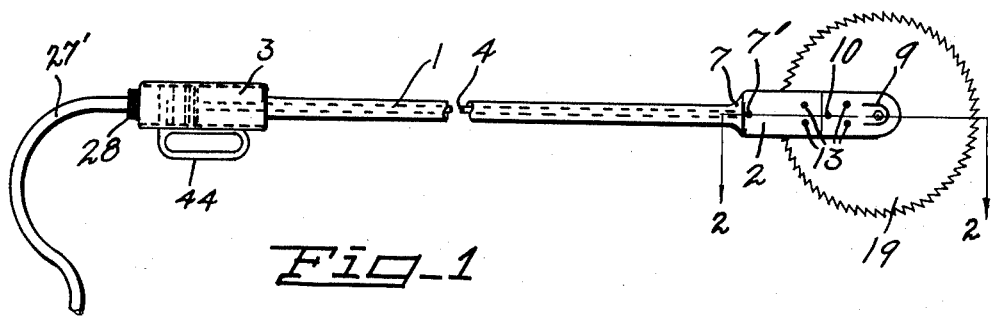
Fig. 1 is a side view of the improved pruning saw.
Figure 2:
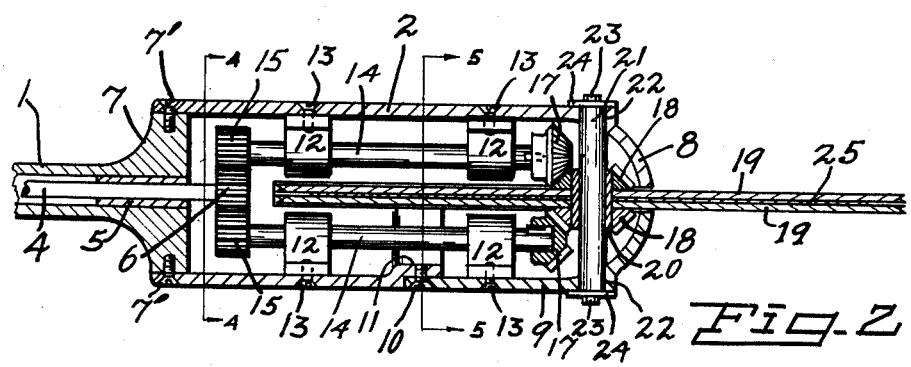
Fig. 2 is a sectional view taken longitudinally through the transmission housing at the front end of the pruner along the line 2—2 of Figure 1.
Figure 3:
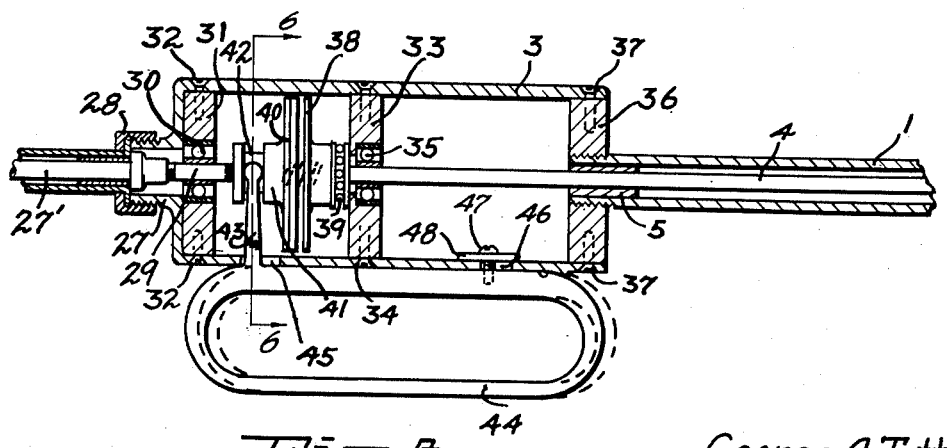
Fig. 3 is a sectional view taken longitudinally through the clutch housing at the rear end of the pruner.
Figure 4:
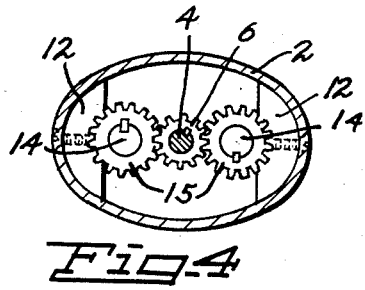
Fig. 4 is a transverse sectional view taken along the line 4—4 of Figure 2.
Figure 5:
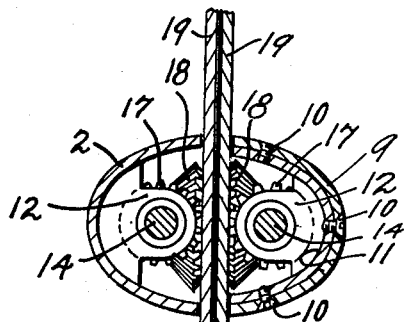
Fig. 5 is a similar view taken along the line 5—5 of Figure 2.
Figure 6:
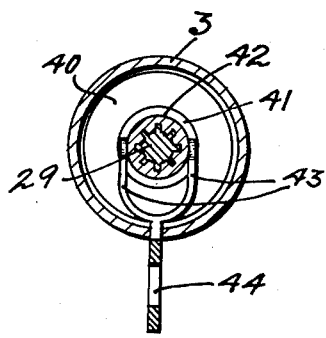
Fig. 6 is a transverse view taken along the line 6—6 of Figure 3.
Figure 7:
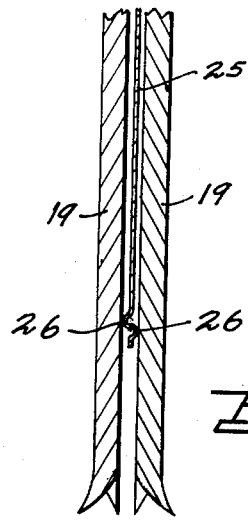
Fig. 7 is a fragmentary sectional view upon an enlarged scale taken through the rotary blades radially thereof.

This improved pruning saw has a handle 1 formed from a metal tube and having at its front end a transmission housing or head 2 and at its rear end a clutch housing or casing 3. A main shaft or drive shaft 4 extends longitudinally through the handle and is rotatably mounted through bearing sleeves 5 with its front end projecting into the housing 2 and carrying a gear or pinion 6. A head 7 at the front end of the handle serves as a closure for the rear end of the housing and is removably secured by screws 7' and the front end of the housing is closed by a head 8 formed integral with the walls of the housing. The forward portion of one side of the housing is open, and this side opening is normally closed by a closure plate 9 which is removably secured in place by screws 10 which are passed inwardly through openings formed through the rear end portion of the closure plate and screwed into threaded openings formed in the inwardly offset lip 11 of the rear end portion of this side of the housing.

Bearings 12 in opposite side portions of the housing are spaced from each other longitudinally of the housing and secured by screws 13 and through these bearings are rotatably mounted counter shafts 14 having at their rear ends pinions 15. The pinions 15 mesh with opposite side portions of a pinion 16 mounted at the front end of the drive shaft 4 and rotate in the same direction. When the screws 7' are removed the housing may be drawn forwardly out of position about the head 7 and during this movement the pinion 16 will move out of engagement with the pinions 15. By removing the closure plate 9 access may be had to the forward portion of the interior of the housing. Since the screws which secure the forward bearing at one side of the housing pass through the closure plate, the plate will be held against transverse movement and can not shift out of its proper position in closing relation to the housing.

At their front ends the shafts 14 carry beveled gears 17 which mesh with beveled gears 18 mounted against outer side faces of circular saw blades 19. These saw blades and their beveled gears fit about a bearing sleeve 20 carried by a shaft 21 which extends transversely through the forward portion of the housing and has its end portions passed through openings 22 at opposite sides of the housing and formed with threaded openings or sockets to receive screws 23 about which are fitted washers 24 which grip the housing when the screws are tightened and firmly hold the shaft stationary. The gears 18 fit between the gears 17 and engage opposite sides thereof and during rotation of the shafts 14 the saw blades will be rotated in opposite directions. The blades are in close proximity to each other and in order to prevent them from having face to face engagement with each other there has been provided a spacing disk 25 which is mounted rigidly about the sleeve 20 and has its marginal edge portion crimped to form circular ridges 26 which project from opposite side faces of the disk and have contacting engagement with confronting faces of the saw blades. The ridges hold the saw blades spaced from each other and since the portions of the ridges which bear against the blades are very narrow friction will be reduced to a minimum and the blades allowed to turn freely in opposite directions. The marginal edge of the spacing disk is spaced inwardly from the toothed edges of the blades and will not have contact with a tree limb being cut. Due to the fact that the saw blades are very close to each other they will make a single cut through a tree limb and as the blades are turning in opposite directions they act against each other to prevent back lashing and the blades will remain in cutting engagement with the tree limb and not have a tendency to jump out of contact with the tree limb during a cutting operation.

In order to impart rotary motion to the drive shaft 4 there has been provided a flexible power shaft 27' which may be connected at its end with a motor or other suitable source of rotary motion. The front end portion of the power shaft is fitted into a neck 27 at the rear end of the clutch housing or casing 3 where it is held by a cap nut 28 and has engagement with the rear end of a stub shaft 29 rotatably mounted through a bearing 30 at the center of a disk or partition 31. The partition 31 is secured in the rear end of the casing 3 by screws 32 and substantially midway the length of this casing is a second partition 33 which is secured by screws 34 and has a bearing 35 at its center. The front end of the clutch casing is closed by a disk or head 36 held in place by screws 37 and formed at its center with a threaded opening into which is screwed the threaded rear end of the tubular handle 1. The drive shaft 4 extends from the rear end of the handle into the clutch casing and its rear end portion is rotatably mounted through the bearing 35 and at its rear end carries a clutch member 38 braced against forward movement by a thrust bearing 39. Companion to the clutch member 38 is a movable clutch member 40 which is keyed to the stub shaft but turns therewith, and this movable clutch member has a hub portion 41 formed with a circumferentially extending groove 42 into which fit the arms of a fork 43 carried by a hand grip 44. This hand grip extends longitudinally of the clutch casing, externally thereof, and the fork passes through a slot 45 into the casing. A second slot 46 is formed in the forward portion of the casing and through this slot passes a screw 47 which is screwed into a socket form in the hand grip and carries a washer 48 which bridges the slot and slidably mounts the hand grip.

When this pruning saw is in use it is grasped by its handle 1 and extended from the workman towards a tree limb to be cut off. The saw blades are brought into contact with the tree limb and since they rotate in opposite directions their teeth will cut the limb without back lash which would tend to cause the saw to be thrown out of contact with the tree limb. The tree limb will thus be quickly cut through and in addition there will not be danger of another workman being injured by being struck with the rotating saw blades. The workman grasps the hand grip 44 and by sliding it along the clutch casing the shiftable clutch member 40 may be moved into and out of contact with the clutch member 38 and rotation of the drive shaft and the saw blades stopped when the trimmer is not actually in use and started again when a tree limb is to be cut off.

Having thus described the invention, what is claimed is:

In a tree pruning device, a handle, a housing at the front end of said handle, a shaft mounted transversely through the housing at the front end thereof, a sleeve about the shaft midway the length thereof, rotary saw blades loose about said sleeve close to each other and each having a bevelled gear upon its outer side face surrounding the sleeve, a spacing disk about the sleeve between said blades formed with circumferentially extending ridges disposed close to its periphery and engaging confronting inner side faces of the saw blades and holding the blades spaced from each other, remaining portions of the disk being spaced from confronting side faces of the saw blades, a drive shaft rotatably mounted in said handle and extending longitudinally therein with its front end projecting into the housing, and mechanism in said housing for transmitting rotary motion from the drive shaft to the saw blades and rotating the blades in opposite directions.

GEORGE A. TUTTLE.

REFERENCES CITED

The following references are of record in the file of this patent:

UNITED STATES PATENTS

| Number | Name | Date |
|---|---|---|
| 935,137 | Abeyta | Sept. 28, 1909 |
| 963,520 | Costello | July 5, 1910 |
| 1,021,605 | Hustace et al. | Mar. 26, 1912 |
| 2,139,273 | Jaworski | Dec. 6, 1938 |
| 2,344,262 | Odierna et al. | Mar. 14, 1944 |